US007380444B2

(12) United States Patent
Tokugawa et al.

(10) Patent No.: US 7,380,444 B2
(45) Date of Patent: Jun. 3, 2008

(54) ACCELERATION/DECELERATION DETECTION DEVICE AND METHOD FOR FOUR-CYCLE ENGINES

(75) Inventors: Kazuhito Tokugawa, Shioya-gun (JP); Tomoo Shimokawa, Shioya-gun (JP); Shinichi Ishikawa, Shioya-gun (JP); Takashi Namari, Shioya-gun (JP)

(73) Assignee: Keihin Corporation, Tokyo (JP)

( * ) Notice: Subject to any disclaimer, the term of this patent is extended or adjusted under 35 U.S.C. 154(b) by 83 days.

(21) Appl. No.: 11/265,301

(22) Filed: Nov. 3, 2005

(65) Prior Publication Data

US 2006/0096361 A1 May 11, 2006

(30) Foreign Application Priority Data

Nov. 9, 2004 (JP) ............................ 2004-324859

(51) Int. Cl.
*G01M 15/00* (2006.01)

(52) U.S. Cl. .................................................... 73/117.3

(58) Field of Classification Search .................. 73/116, 73/117.2, 117.3, 118.1, 118.2
See application file for complete search history.

(56) References Cited

U.S. PATENT DOCUMENTS 6,598,469 B2 * 7/2003 Shimoyama et al. ...... 73/117.3
7,140,356 B2 * 11/2006 Kishibata et al. ........... 123/492
2002/0112536 A1 8/2002 Shimoyama et al.

FOREIGN PATENT DOCUMENTS

| | | |
|---|---|---|
| EP | 1 447 552 A1 | 8/2004 |
| JP | 8-135491 | 5/1996 |
| JP | 2002-317684 | 10/2002 |
| WO | WO 03/038263 | 5/2003 |

OTHER PUBLICATIONS

European Search Report dated Mar. 26, 2007, Application No. 05110349.7-1263.

Notice of Reason for Rejection in Japanese Patent Application No. 2004-324859 from the Japanese Patent Office.

* cited by examiner

*Primary Examiner*—Eric S. McCall
(74) *Attorney, Agent, or Firm*—Westerman, Hattori, Daniels & Adrian, LLP.

(57) ABSTRACT

The engine acceleration detection device compares a intake manifold pressure at a certain crankshaft angle with the intake manifold pressure at 720 degrees before this crankshaft angle. If the difference between these two pressures is a predetermined value or more and the former is higher than the latter, the engine acceleration detection device determines that the engine is in acceleration status. The acceleration of the engine is determined without using a throttle valve opening sensor.

8 Claims, 13 Drawing Sheets

ACCELERATION/DECELERATION DETECTION DEVICE AND METHOD FOR FOUR-CYCLE ENGINES

BACKGROUND OF THE INVENTION

1. Field of the Invention

The present invention relates to an acceleration/deceleration detection device and method for a four-cycle engine, and more particularly to a device and method for detecting the acceleration and deceleration of the engine without using a throttle valve opening sensor.

2. Description of the Related Art

In a typical engine, a throttle valve opening sensor, intake manifold pressure sensor (intake air pressure sensor) and crankshaft angle sensor are connected to an engine control device. The throttle valve opening sensor detects the opening degree of the throttle valve, and the manifold pressure sensor detects the intake air pressure inside the intake air passage. In the engine control device, the engine speed is acquired by numerical processing on the output value of the crankshaft angle sensor. The acceleration and deceleration of the engine is determined (detected) based on the engine speed and the throttle valve opening. The basic fuel injection volume is determined based on the engine speed, and the compensation fuel volume during acceleration is determined based on the throttle valve opening. Such an engine control device is disclosed in Japanese patent Application Kokai (Laid-Open) No.8-135491. The throttle valve opening sensor is indispensable to detect the acceleration and deceleration of the engine.

SUMMARY OF THE INVENTION

One object of the present invention is to provide a device for detecting the acceleration and deceleration of an engine without using the throttle valve opening sensor.

Another object of the present invention is to provide a method for detecting the acceleration and deceleration of an engine without using the throttle valve opening sensor.

According to a first aspect of the present invention, there is provided an improved acceleration detection device for a four-cycle engine. This acceleration detection device includes a comparison unit for comparing an intake manifold pressure at a predetermined crankshaft angle with another intake manifold pressure at 720 degrees before this crankshaft angle. The acceleration detection device also includes a determination unit for determining whether the engine is in acceleration status. The determination unit determines that the engine is in acceleration status when the difference between these two manifold pressures is greater than an acceleration judgment threshold value and the intake manifold pressure at the predetermined crankshaft angle is higher than the intake manifold pressure at 720 degrees before the crankshaft angle.

This acceleration detection device does not use a throttle valve opening sensor to detect (determine) acceleration. Acceleration is detected only by the values of the intake manifold pressure.

Since the throttle value opening sensor is not used, acceleration/deceleration can be judged by an inexpensive device.

It is preferable that the determination unit performs acceleration status determination when the difference between the intake manifold pressure at 720 degrees before the above-mentioned crankshaft angle and the intake manifold pressure at 1440 degrees (or another 720 degrees) before the above-mentioned crankshaft angle is a predetermined value or less.

According to a second aspect of the present invention, there is provided an improved deceleration detection device for a four-cycle engine. This deceleration detection device includes a comparison unit for comparing the intake manifold pressure at a predetermined crankshaft angle and the intake manifold pressure at 720 degrees before this crankshaft angle. The deceleration detection unit also includes a determination unit for determining that the engine is in deceleration status when the difference of these two manifold pressures is greater than a deceleration judgment threshold value, and the intake manifold pressure at the predetermined crankshaft angle is lower than the intake manifold pressure at 720 degrees before the crankshaft angle.

This deceleration detection device does not use a throttle valve opening sensor to detect deceleration. Deceleration is detected only by the intake manifold pressures.

According to a third aspect of the present invention, there is provided a device which includes a pressure sensor for measuring the intake manifold pressure of a four-cycle engine, and a storage unit for supplying the measurement values of the pressure sensor at the crankshaft angle 720-degree interval. The device also includes a stable status judgment unit for judging that the engine is in stable status when at least a certain number of the measurement values from the storage unit fall within a predetermined range in a certain time. The device also includes a comparison unit for comparing the intake manifold pressure measurement value at a predetermined crankshaft angle with another intake manifold pressure measurement value at 720 degrees before this crankshaft angle when the stable status judgment unit judged that the engine is in stable status. The device also includes an acceleration/deceleration judgment unit for judging that the engine is in acceleration status when the difference of these two manifold pressure measurement values is greater than an acceleration judgment threshold value, and the intake manifold pressure measurement value at the predetermined crankshaft angle is higher than the intake manifold pressure measurement value at 720 degrees before this crankshaft angle.

It is preferable that the acceleration/deceleration judgment unit judges that the engine is in deceleration status when the difference between the two manifold pressure measurement values is greater than a deceleration judgment threshold value, and the intake manifold pressure measurement value at the predetermined crankshaft angle is lower than the intake manifold pressure measurement value at 720 degrees before this crankshaft angle.

This device does not rely upon the throttle valve opening sensor to detect acceleration and deceleration. Acceleration and deceleration is detected only by the intake manifold pressures.

According to a fourth aspect of the present invention, there is provided an acceleration detection method for a four-cycle engine which includes steps of: comparing the intake manifold pressure at a predetermined crankshaft angle with the intake manifold pressure at 720 degrees before this crankshaft angle; and judging that the engine is in acceleration status when the difference of these two manifold pressures is greater than a predetermined value and the intake manifold pressure at the predetermined crankshaft angle is higher than the intake manifold pressure at 720 degrees before this crankshaft angle.

This method does not rely upon the throttle valve opening sensor to detect acceleration. Acceleration is detected only by the intake manifold pressures.

According to a fifth aspect of the present invention, there is provided a deceleration detection method, comprising steps of: comparing the intake manifold pressure at a predetermined crankshaft angle and the intake manifold pressure at 720 degrees before this crankshaft angle; and judging that the engine is in deceleration status when the difference of these two manifold pressures is greater than a predetermined value and the intake manifold pressure at the predetermined crankshaft angle is lower than the intake manifold pressure at 720 degrees before this crankshaft angle.

This deceleration detection method does not rely upon a throttle valve opening sensor to detect deceleration. Deceleration is detected only by the intake manifold pressures.

These and other objects, aspects and advantages of the present invention will become apparent to those skilled in the art from the following detailed description and appended claims when read and understood in conjunction with the accompanying drawings.

DETAILED DESCRIPTION OF THE INVENTION

Embodiments of the present invention will now be described with reference to the accompanying drawings.

Figure 1:
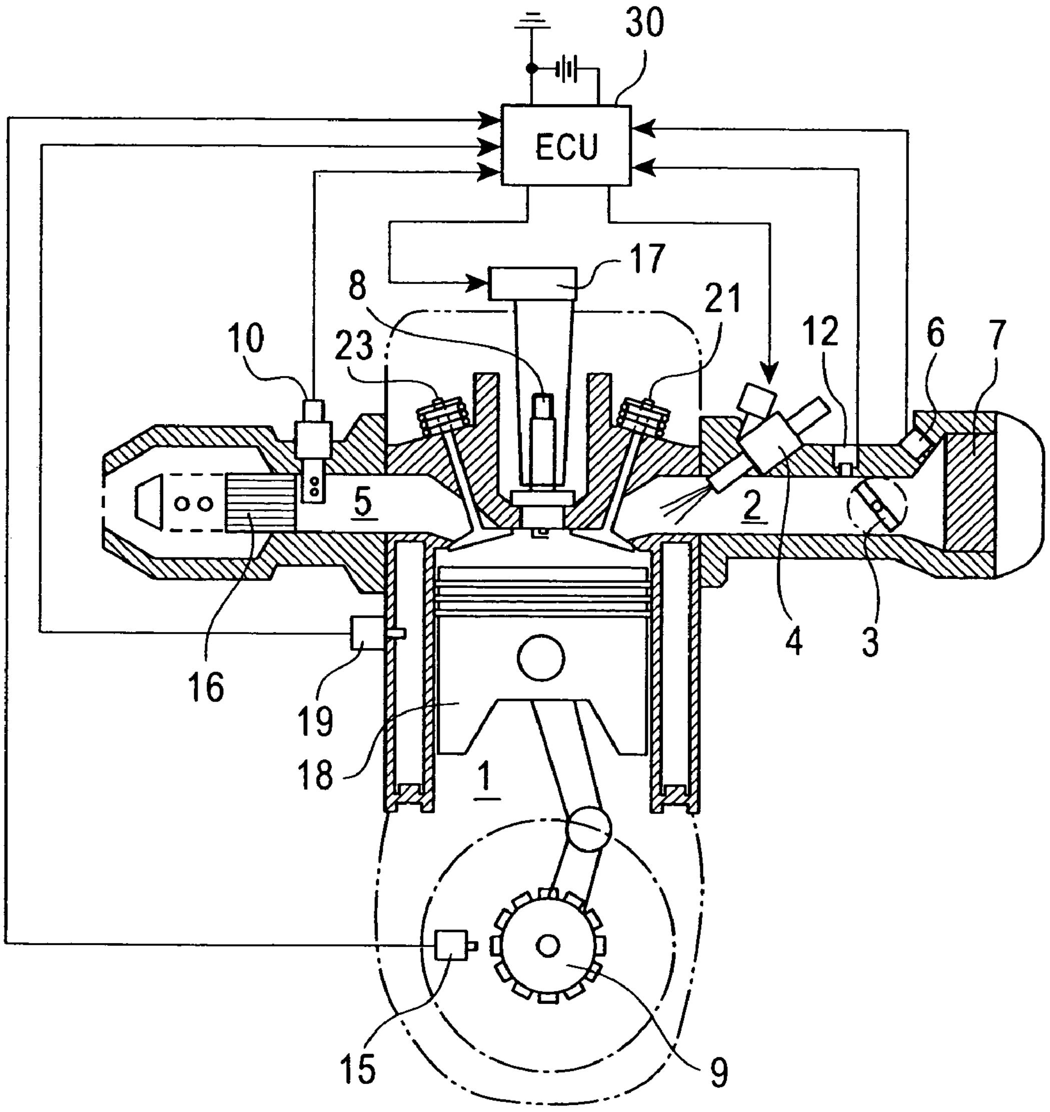
FIG. 1 is a diagram depicting an engine together with the intake/exhaust passages, ECU and other components connected to the engine according to a first embodiment of the present invention.
Figure 2:
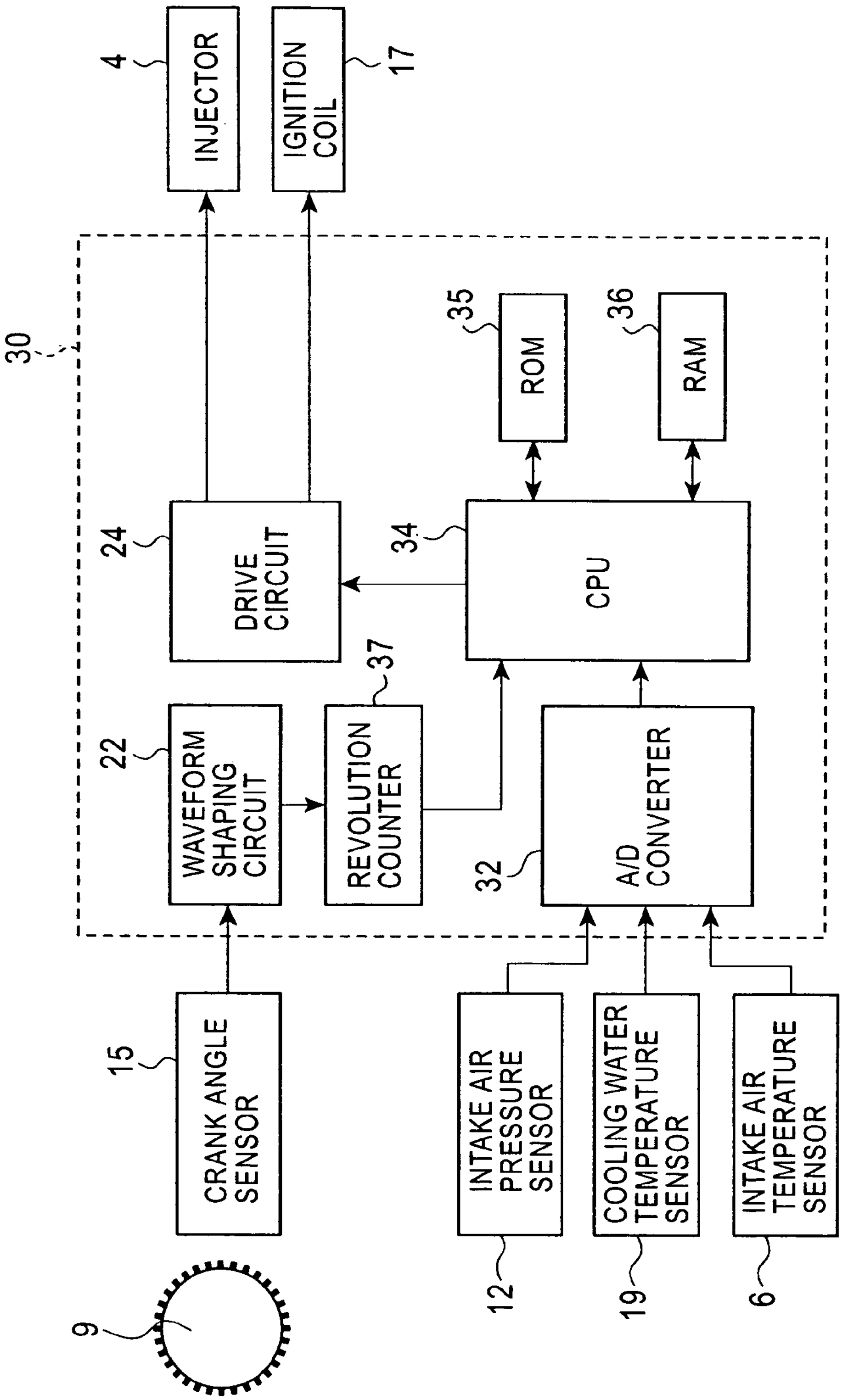
FIG. 2 is a block diagram depicting the ECU in FIG. 1 and the sensors connected thereof.

Referring to FIG. 1, an intake passage 2, exhaust passage 5 and engine control unit (hereafter ECU) 30 are connected to an internal combustion engine 1. FIG. 2 shows the ECU 30 together with the sensors and other parts connected thereto. In the present embodiment, the engine 1 is a four-cycle single-cylinder engine.

As FIG. 1 shows, a throttle valve 3 for controlling the intake air quantity is installed in the intake air passage 2 of engine 1. There is no throttle valve opening sensor for detecting the opening of the throttle valve 3. The intake air temperature sensor 6 and the air cleaner 7 are provided in the intake air passage 2 at the upstream of the throttle valve 3. The manifold pressure sensor 12 for detecting the pressure of the intake air (intake pipe internal pressure) and the injector 4 for injecting fuel are provided in the intake air passage 2 at the downstream of the throttle valve 3. The fuel from the injector 4 is mixed with the intake air filtered by the air cleaner 7 and becomes a fuel-air mixture, and this fuel-air mixture is introduced to the cylinder of the engine 1. The ignition plug 8 is installed above the cylinder. The ignition coil 17 is connected to the ignition plug 8. The fuel-air mixture which enters the cylinder is ignited by the ignition plug 8, is combusted, and drives (rotates) the crankshaft 9. The fuel-air mixture combusted by the engine 1 is exhausted from the engine 1 to the exhaust passage 5 as exhaust gas. The oxygen sensor 10 and the catalyzer 16 are installed in the exhaust passage 5. The oxygen sensor 10 detects the oxygen density in the exhaust gas. The catalyzer 16 is provided for promoting the purification of the exhaust gas. The crankshaft angle sensor 15 for detecting the angle (angular position) of the crankshaft 9 is installed near the crankshaft 9. Reference numeral 21 designates an intake valve, and reference numeral 23 designates an exhaust valve. The engine cooling water temperature sensor 19 is installed on the wall of the engine cylinder. Reference numeral 18 designates a piston.

The intake air temperature sensor 6, manifold pressure sensor 12, injector 4, ignition coil 17, oxygen sensor 10, cooling water temperature sensor 19 and crankshaft angle sensor 15 are connected to the ECU 30.

As FIG. 2 shows, the ECU 30 includes a waveform shaping circuit 22, engine revolution counter 37, A/D converter 32, drive circuit 24, CPU 34, ROM 35 and RAM 36.

The output signal from the manifold pressure sensor 12 (signal that indicates intake pipe internal pressure) is supplied to the ECU 30. As FIG. 2 shows specifically, the output signal of the manifold pressure sensor 12 is first supplied to the A/D converter 32 in the ECU 30. The A/D converter 32 converts the supplied signal into a digital signal, and supplies this digital signal to the CPU 34.

The output signal from the cooling water temperature sensor 19 and the output signal from the intake air temperature sensor 6 are also supplied to the A/D converter 32 in the ECU 30, and are then supplied to the CPU 34.

The output signal of the crankshaft angle sensor 15 (e.g. pulse signal which is generated at every 20-degree crankshaft angle) is supplied to the waveform shaping circuit 22 in the ECU 30 so that the waveform of this signal is shaped appropriately. Then the resulting signal is supplied to the revolution counter 37. The revolution counter 37 generates a digital value, according to the revolution speed of the engine 1, and sends the digital data of the engine speed to the CPU 34. Therefore the CPU 34 can detect the engine speed, crankshaft angle, intake air temperature, intake pipe internal pressure and cooling water temperature.

The ROM 35, RAM 36 and drive circuit 24 are connected to the CPU 34. The drive circuit 24 is a circuit for driving the fuel injector 4 and the ignition coil 17. When a fuel injection control command is sent from the CPU 34 to the injector 4 via the drive circuit 24, the open/close of the fuel injection valve of the injector 4 is controlled. When an ignition control command is sent from the CPU 34 to the ignition coil 17 via the drive circuit 24, the ignition of the ignition plug 8 is controlled. The ROM 35 stores the programs required for engine control. The RAM 36 stores the output values of the sensors (e.g., manifold pressure sensor 12) and the processing data.

According to the value of the oxygen density in the exhaust gas detected by the oxygen sensor 10, the ECU 30 controls the fuel injection volume from the injector 4. The ECU 30 also adjusts the fuel injection volume from the injector 4 based on the temperature of the engine cooling water detected by the cooling water temperature sensor 19.

Figure 3:
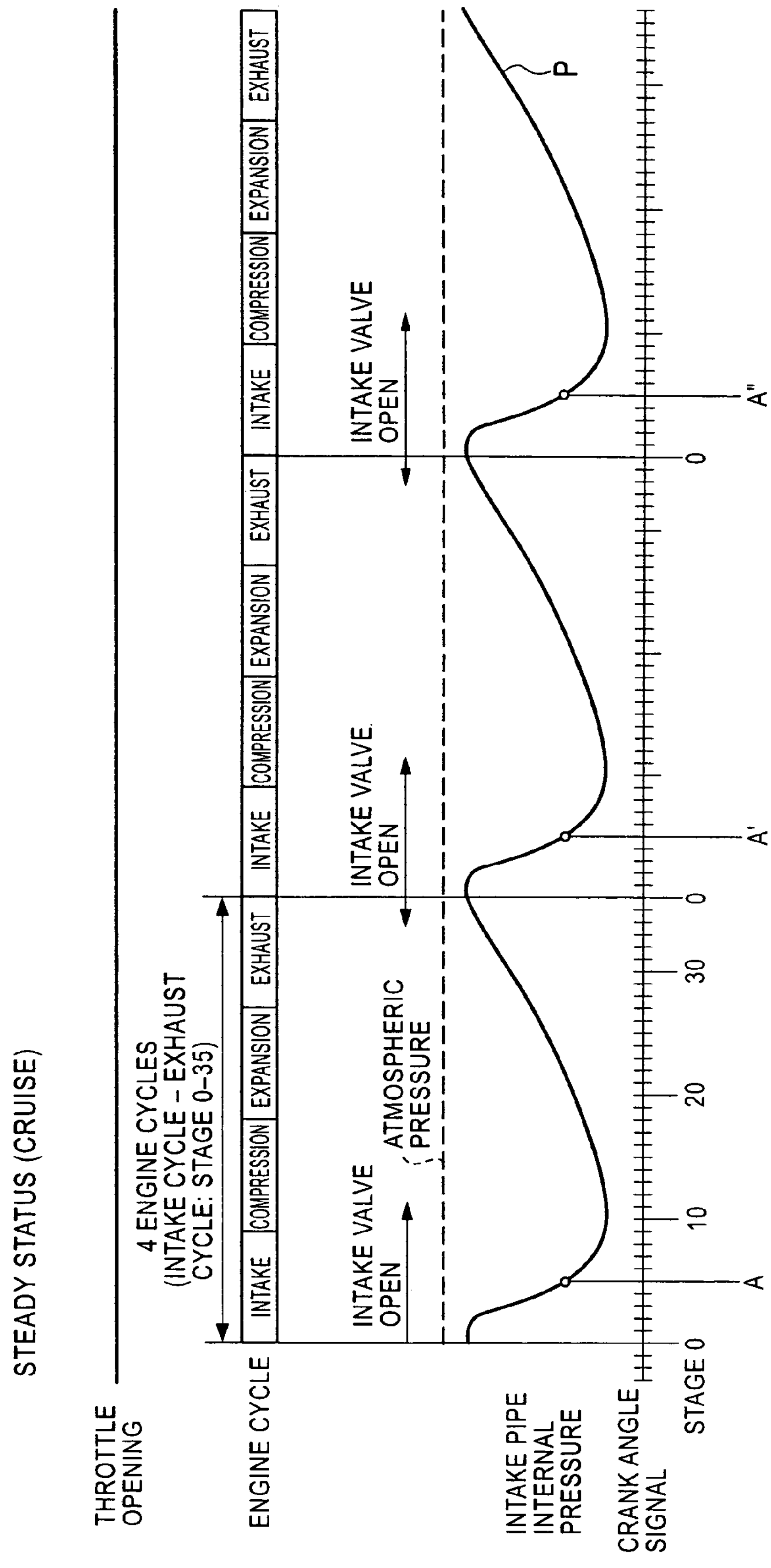
FIG. 3 is a diagram depicting the intake pipe internal pressure measured by the sensor installed in the intake passage in FIG. 1 when the engine is in steady status.
Figure 4:
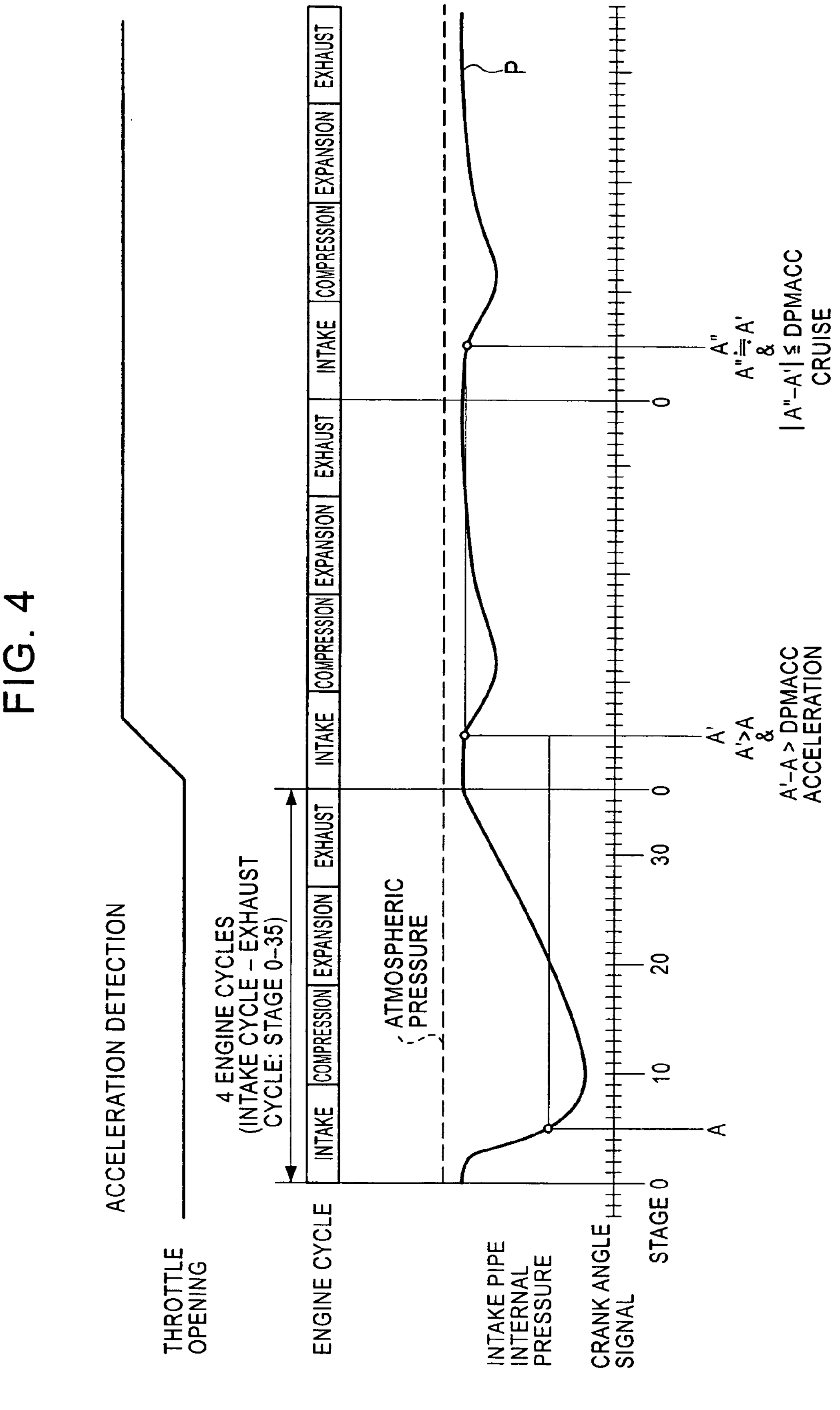
FIG. 4 is a diagram depicting the intake pipe internal pressure when the engine is accelerated.
Figure 5:
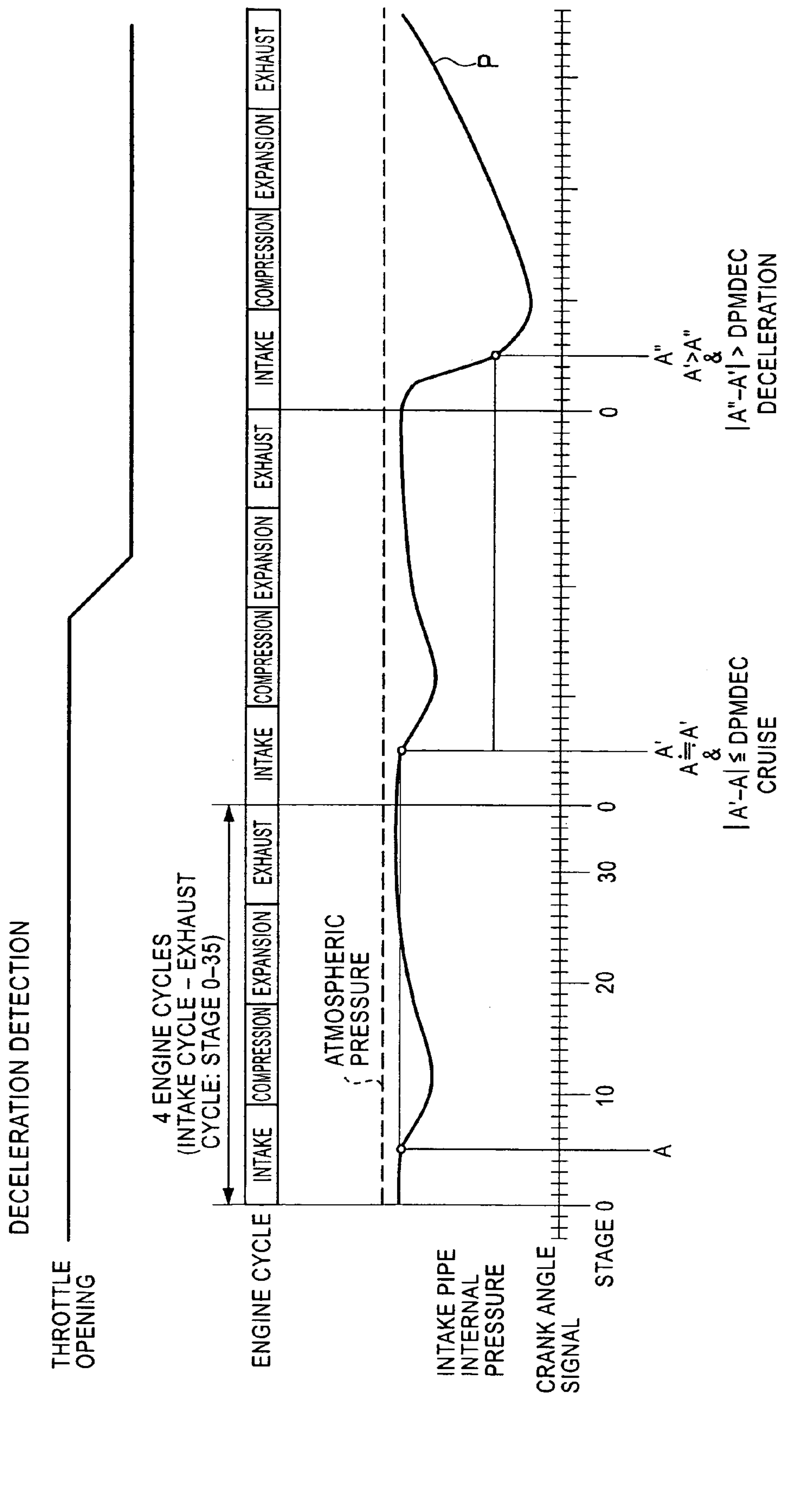
FIG. 5 is a diagram depicting the intake pipe internal pressure when the engine is decelerated.

FIG. 3, FIG. 4 and FIG. 5 are diagrams depicting the change of the internal pressure of the intake passage 2 (intake pipe internal pressure) detected by the intake manifold pressure sensor 12 respectively. Below the curve P of the intake pipe internal pressure, the crankshaft angle (i.e., the output value of the crankshaft angle sensor) is shown as the "crank angle signal". In this embodiment, the crankshaft angle sensor is set such that a pulse is generated at every 20-degree crankshaft angle. This means that 36 pulses are generated during the engine's 4 cycles (intake cycle, compression cycle, expansion cycle and exhaust cycle). The short vertical lines scaled on the horizontal axis of the "crankshaft angle signal" in FIG. 3, FIG. 4 and FIG. 5 show these pulses. With these pulses, it is possible to detect the angle position of the crankshaft, for example, at a 20-degree interval from the top dead center of the engine. The "stage" below the "crank angle signal" is the 20-degree divisions of the 4 engine cycles (intake cycle, compression cycle, expansion cycle and exhaust cycle). Thus, each stage is a 20-degree stage and there are 36 stages in the 4 engine cycles (720 degrees). The first stage (crankshaft angle: 0 to 20 degrees) is stage 0, and the last stage (crankshaft angle: 700 to 720 degrees) is stage 35. Above the intake pipe internal pressure curve P, the engine cycles (intake cycle, compression cycle, expansion cycle and exhaust cycle) are shown. At the top, the opening degree of the throttle valve is indicated as the "throttle opening".

In this embodiment, acceleration, deceleration and steady status are determined based on the intake pipe internal pressure in stage 5 of each 4 engine cycles. In FIG. 3, FIG. 4 and FIG. 5, three continuous 4-engine-cycles are shown. These three 4-engine-cycles are called "first 4-engine-cycle", "second 4-engine-cycle" and "third 4-engine-cycle" in this specification. The intake pipe internal pressure in stage 5 of the first 4-engine-cycle is value A, the intake pipe internal pressure in stage 5 of the second 4-engine-cycle is A', and the intake pipe internal pressure in stage 5 of the third 4-engine-cycle is A".

Referring first to FIG. 3, the pressure in the intake passage 2, when the engine is in steady status, will be described. The steady status is a status when neither acceleration nor deceleration is occurring. In other words, it is a status when the throttle valve opening degree is substantially constant.

As FIG. 3 shows, when the engine is running in steady status, the intake pipe internal pressure steeply drops if the intake valve is opened in the intake cycle. The intake pipe internal pressures starts to increase in the compression cycle because the intake valve is closed. The intake valve remains closed in the expansion cycle and exhaust cycle so that the intake pipe internal pressure continues rising during the expansion cycle and exhaust cycle. In the next cycle (i.e., intake cycle), the intake valve is opened so that the intake pipe internal pressure steeply drops. When the engine is operated in steady status, such an intake pipe internal pressure curve is repeatedly detected. During steady status operation, the value A is substantially the same as the value A', and the value A' is substantially the same as the value A".

In the steady status, the value of the intake pipe internal pressure detected at an arbitrary crankshaft angle and the value of the intake pipe internal pressure, detected at 720 degrees after this crankshaft angle, are roughly the same regardless the stage of the engine cycle (i.e., regardless of when the intake pipe internal pressures are detected).

FIG. 4 is a continuation of FIG. 3, and shows an example of the change of the intake pipe internal pressure P when the engine running condition changes to an accelerated status from a steady status. In this example, the engine running in a steady status is accelerated when an intake cycle starts, and then the accelerated status is maintained. The acceleration operation refers to the operation of increasing the opening of the throttle valve. In FIG. 4, the engine is accelerated at the beginning of the second 4-engine-cycle (i.e., in the second intake cycle). In the first 4-engine-cycle, the intake pipe internal pressure curve is the same as that of the steady status (the same as FIG. 3), and in the second and third 4-engine-cycles, the intake pipe internal pressure curve takes the curve of acceleration. When the throttle valve is opened, the intake pipe internal pressure hardly drops even in the intake cycle (A'). This is because the intake manifold pressure sensor 12 (FIG. 1) is subjected to the atmospheric air with hardly any obstacles if the throttle valve 3 is opened upon the acceleration operation. Therefore during acceleration, the output value of the intake manifold pressure sensor 12 indicates a value close to the atmospheric pressure. This "high manifold pressure" status is maintained in the compression cycle, expansion cycle and exhaust cycle after the intake cycle, as long as the throttle valve is maintained in open status. In the next 4-engine-cycle, the intake pipe internal pressure is maintained roughly at the atmospheric pressure since the throttle valve is still in open status. The curves of the intake pipe internal pressure P of the second 4-engine-cycle in FIG. 4 and the third 4-engine-cycle are almost the same. In the second 4-engine-cycle in FIG. 4 and in the third 4-engine-cycle, accelerated status (high-speed status) is maintained. Thus, this status may be called the "accelerated (high-speed) steady status".

FIG. 5 is a continuation of FIG. 4, and shows an example of the change of the intake pipe internal pressure P when the engine running condition changes to a deceleration status from the high-speed steady status. In this example, the engine maintaining the high-speed steady status is decelerated from the compression cycle to the expansion cycle of the second 4-engine-cycle, and then the low-speed status is maintained. The deceleration operation refers to the operation of decreasing the opening of the throttle valve. From the intake cycle of the first 4-engine-cycle to the compression cycle of the second 4-engine-cycle in FIG. 5, the intake pipe internal pressure takes the curve of high-speed steady status (the same as FIG. 4). If the throttle valve is operated toward the closing direction in the compression cycle of the second 4-engine-cycle, as shown in FIG. 5, the intake pipe internal pressure suddenly drops in the intake cycle in the third 4-engine-cycle (A"). This is because the intake manifold pressure sensor 12 (FIG. 1) measures the negative pressure generated in the intake cycle when the throttle valve 3 is operated to the close direction by the deceleration operation because a large obstacle, which is the throttle valve 3 upstream of the intake manifold pressure sensor 12, exists between the intake manifold pressure sensor 12 and the atmosphere.

Now the detection of the acceleration, deceleration and steady statuses will be described.

In the present embodiment, the acceleration, deceleration and steady statuses are determined using the values of the intake pipe internal pressure during the intake cycle. In the present embodiment, a value of the intake pipe internal pressure roughly at the center of each intake cycle (the value of the intake pipe internal pressure at the position at the 100 degree crankshaft angle from the top dead center, i.e., the value of the intake pipe internal pressure in stage 5) is used. The white circles (reference symbols A, A' and A") on the intake pipe internal pressure curve P in FIG. 3 to FIG. 5 are the values used for determination of the acceleration, deceleration and steady statuses. The intake pipe internal pressure values A, A' and A" are stored in the RAM 36. The value A' is a value detected at 720 degrees after the crankshaft angle of the value A, and the value A" is a value detected at 720 degrees after the crankshaft angle of the value A'.

First the way of determining the acceleration status of the engine will be described with reference to FIG. 4. In FIG. 4 the engine is driven at an intermediate speed in steady status in the first 4-engine-cycle, acceleration operation is performed in the intake cycle of the second 4-engine-cycle, and the high-speed status (accelerated status) is maintained until the third 4-engine-cycle ends.

As FIG. 4 shows, the value of the intake pipe internal pressure in the steady status is A. When the acceleration operation is performed, the value of the intake pipe internal pressure rises to A', and the value of the intake pipe internal pressure in the high-speed maintaining status is A". In this embodiment, if the difference between the value of the intake pipe internal pressure at the point of acceleration determination ("current point") and the value of the intake pipe internal pressure at 720 degrees before the current crankshaft angle is greater than a predetermined value (acceleration determination threshold value) DPMACC, and the former value is greater than the latter value, it is determined that the acceleration operation was performed. The acceleration determination threshold value DPMACC is, for example, 10 kPa and stored in the RAM in advance.

As understood from FIG. 4, the difference between the value A and the value A' (|value A'−value A|) is greater than the acceleration determination threshold value DPMACC, and the value A' is greater than the value A (value A'−value A is a positive value). Therefore in stage 5 of the second 4 engine cycles it is determined that the acceleration operation was performed. In other words, in this example, the acceleration operation started around stage 2 of the second 4 engine cycles is detected in stage 5.

Then the value of the intake pipe internal pressure of the second 4 engine cycles and that of the third 4 engine cycles (value A' and value A" in FIG. 4) are compared to each other. Since the value A" and the value A' are roughly the same, the difference between the value A" and value A' (|value A"−value A'|) is less than the acceleration determination threshold value DPMACC. In this case, it is determined that the engine is in a steady status (high-speed steady status or accelerated steady status). The steady status (cruise) in this case refers to "being steady (no acceleration or deceleration)" from the immediately preceding condition. In the case of FIG. 4, the engine is "steady", i.e., maintained in the high-speed status. In actual driving, the opening of the throttle valve may change slightly even if the driver believes that the accelerator pedal or acceleration handle is fixed to a certain position. Therefore if the absolute value of the value A"−value A' falls within a predetermined range, it is determined as steady driving.

Now the method of determining the deceleration status of the engine will be described with reference to FIG. 5. In the first 4 engine cycles, the engine is driven in steady status, and the deceleration operation is performed from the compression cycle to the expansion cycle in the second 4 engine cycles, and then the decelerated status (low-speed status) is maintained until the end of the third 4 engine cycles. To determine deceleration, a predetermined deceleration determination threshold value DPMDEC (e.g., 7 kPa) is used. If |value A"−value A'| is greater than the deceleration determination threshold value DPMDEC and the value A"−value A' is a negative value, it is determined that the engine deceleration operation was performed.

In FIG. 5, the value A of the intake pipe internal pressure in the first 4 engine cycles is almost equal to the value A' of the intake pipe internal pressure in the second 4 engine cycles. Therefore |value A'−value A| is not more than the deceleration determination threshold value DPMDEC. In this case, it is determined that the engine is driven in steady status. If the deceleration operation is performed in the middle of the second 4 engine cycles, the value of the intake pipe internal pressure in the third 4 engine cycles drops to A". Since |value A'−value A'| is greater than the deceleration determination threshold value DPMDEC, and value A"−value A' is a negative value, it is determined that the engine is in deceleration status in the third 4 engine cycles. In other words, in the case of the example in FIG. 5, the deceleration operation performed in the middle of the second 4 engine cycles is detected in the intake cycle of the third 4 engine cycles.

After the acceleration, deceleration or steady status of the engine is determined, the fuel injection volume and the fuel injection timing, for example, are adjusted based on the determination result. In other words, it is determined in which stage (or in which cycle) the acceleration or deceleration was performed, and the determination result is used for the fuel control routine.

A comparison of value A and value A' and a comparison of value A' and value A' are performed by the CPU 34. The CPU 34 also determines the acceleration, deceleration and steady statuses.

Figure 6:
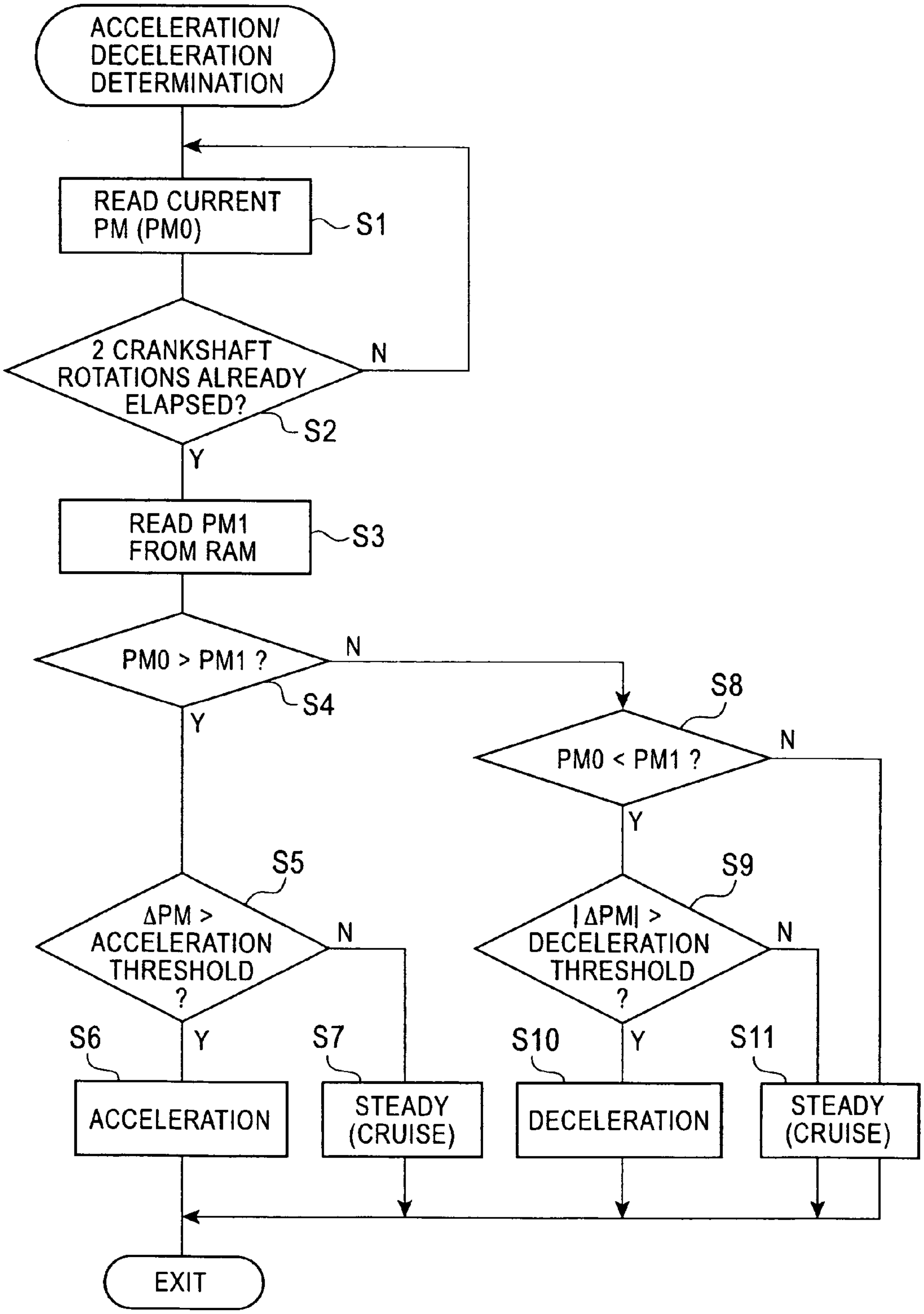
FIG. 6 is a flow chart of acceleration/deceleration judgment.

The way of determining the acceleration, deceleration and steady status is not limited to the above mentioned approach. For example, the way of determination shown in the flow chart in FIG. 6 may be used. Now the flow chart in FIG. 6 will be described. In FIG. 6, PM indicates the value of the intake pipe internal pressure, and ΔPM indicates the difference of the two intake pipe internal pressure values.

In step S1, the current intake pipe internal pressure value (PM0) is read from the RAM 36 to the CPU 34. In step S2, it is determined whether the intake pipe internal pressure value at 720 degrees before the current crankshaft angle has been also stored in the RAM 36. If the intake pipe internal pressure value at 720 degrees before the current crankshaft angle is not stored in the RAM 36, the processing returns from step S2 to step S1. If the determination in step S2 is YES, this means that two intake pipe internal pressure values are stored in the RAM 36. In the following description, it is assumed that the value (PM0) of the current intake pipe internal pressure at the current crankshaft angle and the value (PM1) of the intake pipe internal pressure at 720 degrees before the current crankshaft angle are stored in the RAM 36. The value of the current intake pipe internal pressure ("current PM") is called PM0, and the value of the intake pipe internal pressure at 720 degrees before the current crankshaft angle ("PM before 2 crankshaft rotations" in FIG. 6) is called PM1.

In step S3, the CPU 34 reads the intake pipe internal pressure value PM1 from the RAM 36. In step S4, the CPU 34 determines whether the current intake pipe internal pressure value PM0 is greater than the previous intake pipe internal pressure value PM1. If the value PM0 is greater than the value PM1, the processing advances from step S4 to step S5, so as to determine whether the difference between the value PM0 and the value PM1 (ΔPM) is greater than the acceleration determination threshold value DPMACC. If the pressure difference ΔPM is greater than the acceleration determination threshold value, the processing advances to step S6, determining this as the acceleration status. If not, the processing advances to step S7, determining this as the steady status.

If it is determined in step S4 that the intake pipe internal pressure value PM0 is not greater than the intake pipe internal pressure value PM1, the processing advances from step S4 to step S8 to determine whether the intake pipe internal pressure value PM0 is smaller than the intake pipe internal pressure value PM1. If the value PM0 is not smaller than PM1, the value PM0 and the value PM1 are the same, so the processing advances to step S11, determining this as the steady status. If it is determined in step S8 that the intake pipe internal pressure value PM0 is smaller than the intake pipe internal pressure value PM1, the processing advances to step S9 to determine whether the absolute value of the difference of these two intake pipe internal pressure values (ΔPM) is greater than the deceleration determination threshold value DPMDEC. If the absolute value of the pressure difference ΔPM is greater than the deceleration determination threshold value, the processing advances to step S10, determining this as deceleration status. If not, the processing advances to step S11, determining this as the steady status.

In the above-described embodiment, the acceleration, deceleration and steady statuses are determined using the difference of the values of the inlet pipe internal pressure in the intake cycle, but the acceleration, deceleration and steady statuses may be determined by comparing the intake pipe internal pressure at a predetermined crankshaft angle in the compression cycle (or expansion cycle or exhaust cycle) and the intake pipe internal pressure at 720 degrees before (or after) this crankshaft angle. The threshold value DPMACC used for the acceleration determination and the threshold value DPMDEC used for the deceleration determination may be changed to values appropriate for the compression cycle (or expansion cycle or exhaust cycle).

The intake pipe internal pressure to be used for acceleration/deceleration/steady status determination may not be the "pressure in the intake cycle" (or "pressure in the compression cycle" or "pressure in the expansion cycle" or "pressure in the exhaust cycle"), but may be "pressure in a certain stage of the engine." The 4 cycles of the engine (720 degrees crankshaft angle) are divided into thirty-six 20-degree stages, so that the acceleration, deceleration and steady statuses of the engine may be determined by selecting one appropriate stage and comparing the two intake pipe internal pressures in the selected stage at a 720-degree crankshaft angle interval. The threshold values DPMACC and DPMDEC may be changed depending on the stage to be selected.

In the above-described embodiment, the crankshaft angle signal is generated at every 20-degree crankshaft angle, but the present invention is not limited in this regard. For example, the crankshaft angle signal may be generated at every 15-degree crankshaft angle (or every 30-degree crankshaft angle). In this case, the engine stages may also be adjusted. Specifically, it is preferable to divide the engine cycles into 15-degree crankshaft angle stages (or in 30-degree crankshaft angle stages).

It should be noted that the threshold values DPMACC and DPMDEC may be changed according to the engine speed. For example, the case when the engine speed is high and the case when the engine speed is low are considered separately, and the threshold values DPMACC and DPMDEC, when the engine speed is high, may be different from those values when the engine speed is low.

Before the acceleration and deceleration are determined, it may be confirmed that the engine is in stable status. This determination of the stable status will be described below with reference to FIG. 4.

In actual driving, the intake pipe internal pressure in the intake cycle may take a high value A' (FIG. 4) under a certain driving condition and/or engine load, even when the acceleration operation is not performed. In such a case, it is not desirable to increase the injection fuel as a result of determining this as acceleration status. To prevent such a control error (an undesirable fuel increase), it is preferable to confirm that the engine is in stable status prior to determining acceleration. Specifically it is determined whether the difference between the value A of the intake pipe internal pressure in the intake cycle and the value of the intake pipe internal pressure at 720 degrees before the crankshaft angle of the value A falls within a predetermined range. If the difference is in the predetermined range, acceleration determination is then performed by using the intake air pressure values A and A'. If the difference is not in the predetermined range, the engine is not in stable status, so that the acceleration determination is prohibited.

It should be noted that in order to determine the stable status of the engine, not only the intake pipe internal pressure at 720 degrees before the crankshaft angle of the value A, but also the intake pipe internal pressure at 1440 degrees before the crankshaft angle of the value A (and the intake pipe internal pressure value even before this) may be considered. In other words, "stable" may be determined when a certain number of the intake pipe internal pressure values, detected at 720-degree crankshaft angle intervals, fall within a predetermined range in a certain period.

As described above, the throttle value opening sensor for detecting the opening degree of the throttle valve 3 is not installed. In other words, the opening degree of the throttle valve 3 is not used in detecting the acceleration/deceleration of the engine. Whether the engine is in acceleration status/deceleration status or not is determined using the output values of the intake manifold pressure sensor 12 installed in the intake passage 2.

Figure 7:
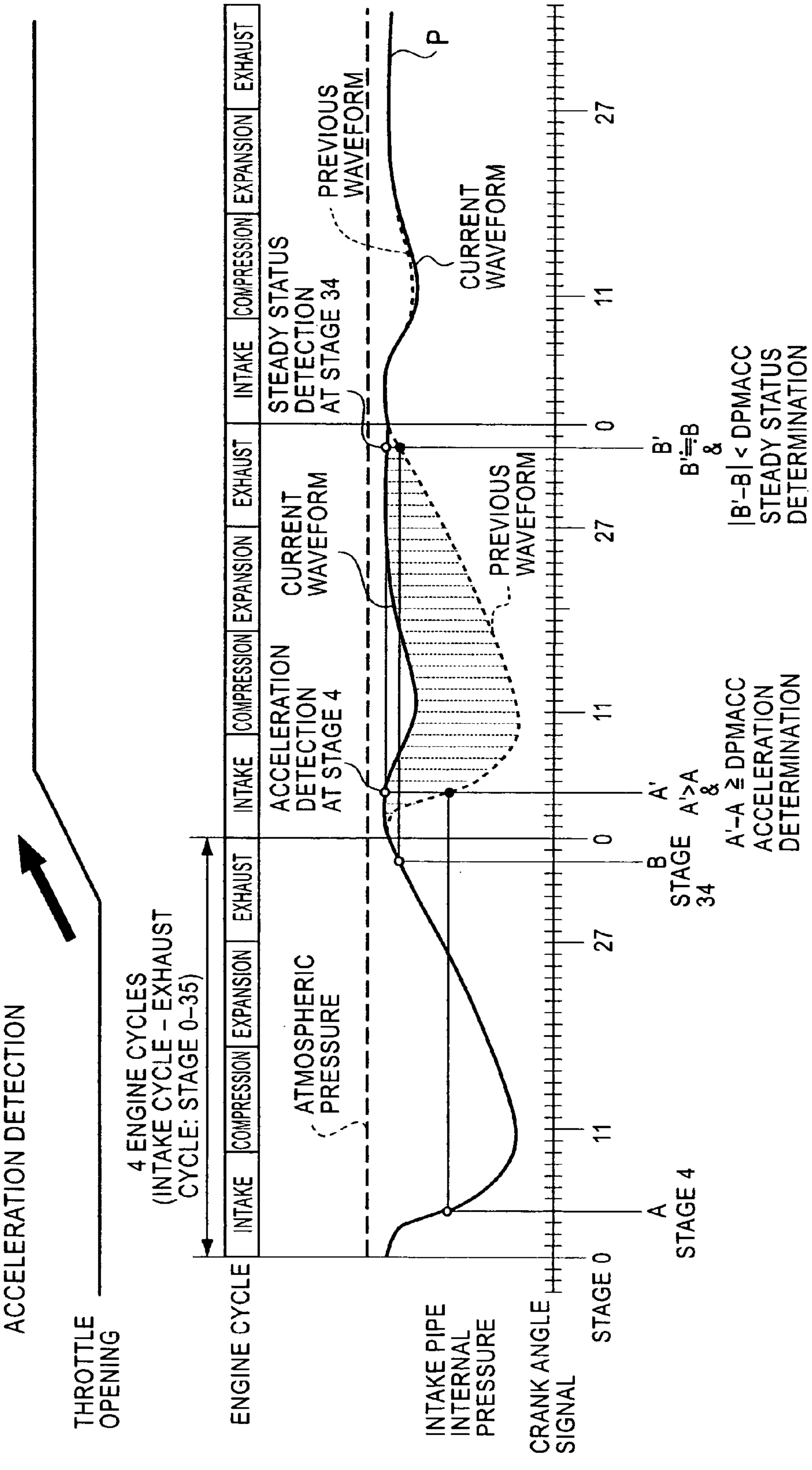
FIG. 7 is a diagram depicting the intake pipe internal pressure for judging acceleration according to a second embodiment of the present invention.

Now the second embodiment of the present invention will be described with reference to FIG. 7. The only difference between the first embodiment and the second embodiment is the method for determining the acceleration, deceleration and steady statuses. Since the configuration of the device used for the second embodiment is the same as that of the first embodiment, description thereof is omitted. In FIG. 7 (and FIG. 8 to FIG. 13), the intake manifold pressure curve at the current crankshaft angle and the intake manifold pressure curve at 720 degrees before the current crankshaft angle are overlapped so as to see the difference thereof clearly.

As FIG. 7 shows, according to the second embodiment, the acceleration or steady status is determined by the manifold pressures in stage 4 and stage 34 of the first 4 engine cycles and the manifold pressures in stage 4 and stage 34 of the second 4 engine cycles. In the first 4 engine cycles, the detection value in stage 4 is A and the detection value in stage 34 is B. In the second 4 engine cycles, the detection value in stage 4 is A' and the detection value in stage 34 is B'. It should be assumed that the acceleration operation (black arrow) is performed from the exhaust cycle (around stage 32) in the first 4 engine cycles to the intake cycle (around stage 7) in the second 4 engine cycles, and then the accelerated status (high-speed status) is maintained.

In the example in FIG. 7, the value A' is greater than the value A, and the value A'−value A is not less than the acceleration determination threshold value DPMACC, so that the acceleration operation performed on the engine can be detected in stage 4 of the second 4 engine cycles. Specifically, the acceleration operation started around stage 33 of the first 4 engine cycles is detected in stage 4 of the second 4 engine cycles.

The acceleration operation in FIG. 7 cannot be detected by comparing the values of the manifold pressures in stage 3 of the first and second 4 engine cycles. This is because the difference between the manifold pressures is smaller than the acceleration determination threshold value. In other words, the acceleration operation of the engine cannot be determined until stage 4 of the second 4 engine cycles.

Then the value B' in stage 34 of the second 4 engine cycles and the value B at 720 degrees before the crankshaft angle of the value B' are compared. As shown in FIG. 7, the value B' is roughly the same as the value B, and the absolute value of the value B'−value B is less than the acceleration determination threshold value DPMACC. Therefore in stage 34 of the second 4 engine cycles, it is determined that the engine is in the high-speed steady status (status where accelerated condition is maintained). The high-speed steady status cannot be detected by comparing the values of the manifold pressure in stage 33. This is because the difference of the manifold pressure values is not less than the acceleration determination threshold value.

In other words, even if the intake manifold pressure is detected at 20-degree crankshaft angle intervals and each detected value is compared (in all stages 0-35) with the intake manifold pressure at 720 degrees before the crankshaft angle concerned, acceleration cannot be detected until stage 4 of the second 4 engine cycles, and the high-speed steady status cannot be detected until stage 34 of the second 4 engine cycles if the acceleration operation is performed at the end (exhaust cycle) of the first 4 engine cycles, as shown in FIG. 7.

If the second embodiment is compared to the first embodiment, the acceleration/steady status is determined using only the intake manifold pressures in stage 5 of each 4 engine cycles in the first embodiment, but in the second embodiment, the acceleration/steady status is determined using the intake manifold pressures in all stages. In other words, according to the second embodiment, the intake manifold pressures at every 720 degrees are compared in all stages so that the acceleration/steady status is determined as soon as possible. In FIG. 7, "steady status" is determined if the intake manifold pressures in stage 3 are compared, "acceleration" is determined if the intake manifold pressures in stage 4 are compared, and "acceleration" is also determined if the intake manifold pressures in stage 5 are compared. Since "acceleration" is first determined in stage 4, the detected value in stage 4 is used as the value A.

Figure 8:
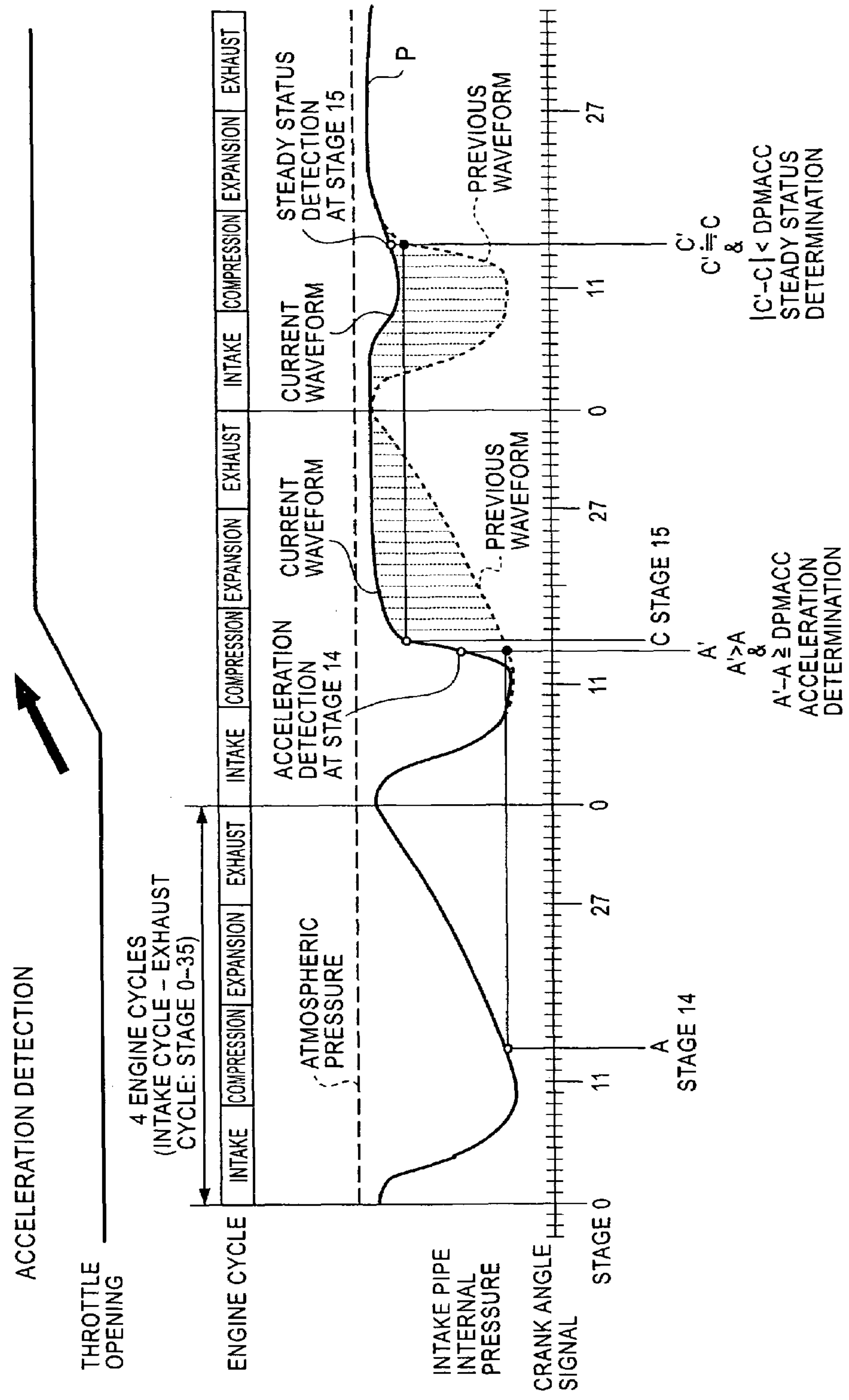
FIG. 8 is a diagram depicting the intake pipe internal pressure according to a modified embodiment of the FIG. 7 embodiment.

FIG. 8 shows a modification to the FIG. 7 embodiment.

As FIG. 8 shows, the intake manifold pressure detected in stage 14 of the first 4 engine cycles is used for acceleration and deceleration determination. The detected value is A. In the second 4 engine cycles, the intake manifold pressures detected in stage 14 and stage 15 are used. The detected value in stage 14 is A', and the detected value in stage 15 is C. In the third 4 engine cycles, the intake manifold pressure detected in stage 15 is used. The detected value is C'. The acceleration operation is performed in the compression cycle of the second 4 engine cycles, and then the high-speed status is maintained. Comparing FIG. 8 with FIG. 7, the timing of the acceleration operation in FIG. 8 is different from that in FIG. 7, so that the intake manifold pressure curve P in the second 4 engine cycles in FIG. 8 is quite different from that in FIG. 7.

In FIG. 8, the value A' and the value A are compared in stage 14 of the second 4 engine cycles. Since the value A' is greater than the value A, and the value A'−value A is not less than the acceleration determination threshold value DPMACC, the acceleration status can be determined in stage 14 of the second 4 engine cycles. The acceleration operation (black arrow), which started in stage 9 of the second 4 engine cycles, is determined in stage 14 of the second 4 engine cycles.

It should be noted that acceleration cannot be determined by comparing the intake manifold pressures in stage 13. This is because the difference of the intake manifold pressures is smaller than the acceleration determination threshold value. In other words, the acceleration cannot be determined until stage 14. Just like FIG. 7, the current manifold pressure (at the current crankshaft angle) and the manifold pressure at 720 degrees before the current crankshaft angle are compared in all stages (stages 0-35), and the acceleration is determined in the stage (stage 14). Stage 14 can determine the acceleration earliest.

Then the value C' and the value C are compared in stage 15 in the third engine 4 cycles. As understood from FIG. 8, the value C' is roughly the same as the value C, and the absolute value of value C'−value C is less than the acceleration determination threshold value DPMACC. Therefore it is determined in stage 15 of the third 4 engine cycles that the engine in the high-speed steady status (status in which accelerated condition is maintained). The high-speed steady status is determined using the manifold pressures after the determination of acceleration is made (stage 14 of the second 4 engine cycles). In the case of FIG. 8, the high-speed steady status cannot be determined until stage 15 of the third 4 engine cycles. This is when the value C' is detected. In other words, FIG. 8 shows an example of detecting "the steady status" earliest after the acceleration is determined. In the case of FIG. 7, the steady status is detected using the value B, which is a value before the acceleration determination, but in FIG. 8, the value C, which is a value after the acceleration determination, is used.

Now the deceleration determination will be described with reference to FIG. 9.

Figure 9:
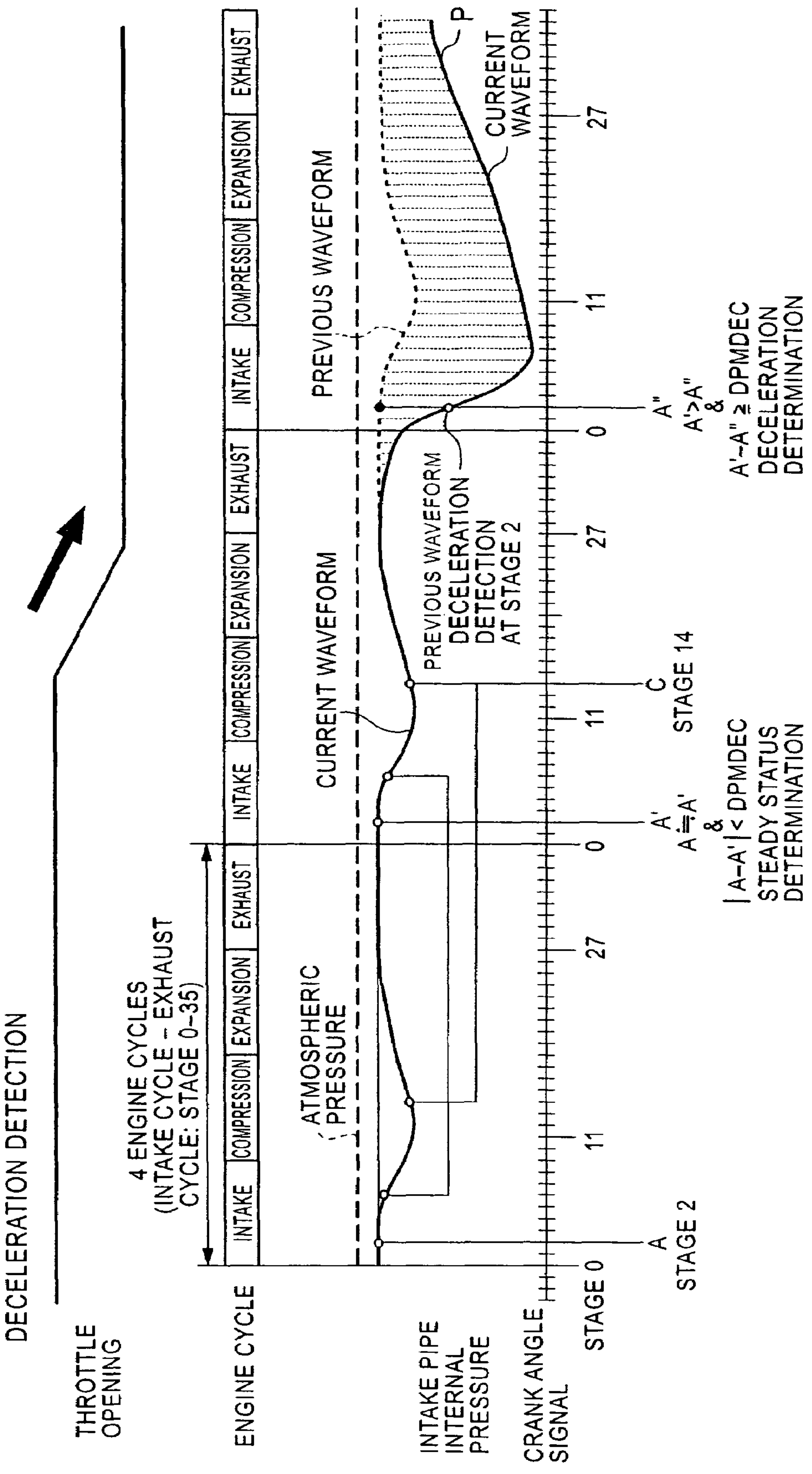
FIG. 9 is a diagram depicting the intake pipe internal pressure for judging deceleration according to the second embodiment of the present invention.

FIG. 9 is a continuation of FIG. 7. FIG. 9 shows the case when the deceleration operation (downward black arrow) is performed on an engine running in high-speed steady status.

In FIG. 9, the deceleration is determined by the manifold pressures A' and A" in stage 2 of the second and third 4 engine cycles. The detected value in stage 2 of the first 4 engine cycles is A. The deceleration operation is performed in the expansion cycle of the second 4 engine cycles, and then the low-speed status (decelerated status) is maintained.

In the example of FIG. 9, the value A" is smaller than the value A', and the value A'−value A" is greater than the deceleration determination threshold value DPMDEC, so that the "engine in deceleration status" can be determined in stage 2 of the third 4 engine cycles. The deceleration status cannot be determined by comparing the values of the manifold pressure in stage 1. This is because the difference of the manifold pressures is smaller than the deceleration determination threshold value. In other words, the deceleration operation performed on the engine cannot be determined until stage 2 of the third 4 engine cycles.

When the intake manifold pressure is detected at a 20 degree crankshaft angle interval in all stages 0-35, and every detected value is compared with the manifold pressure at 720 degrees before the crankshaft angle concerned, the deceleration operation performed in the expansion cycle of the second 4 engine cycles cannot be detected until stage 2 of the third 4 engine cycles, as shown in FIG. 9.

In the deceleration determination of the first embodiment (FIG. 5), the deceleration is determined using only the manifold pressures in stage 5, but in the second embodiment (FIG. 9), the deceleration is determined using the manifold pressures in all stages. In the second embodiment, therefore, the manifold pressures with 720 degree intervals are compared in all stages 0-35 in order to determine deceleration as soon as possible. In FIG. 9, the "steady status" is determined when the manifold pressures in stage 1 are compared, the "deceleration" is determined when the manifold pressures in stage 2 are compared, and the "deceleration" is also determined again when the manifold pressures in stage 3 are compared. Since the "deceleration" is first determined in stage 2, the values detected in stage 2 are used for the values A' and A".

The deceleration operation, which started in stage 18 of the second 4 engine cycles, can be detected in stage 2 of the third 4 engine cycles.

The intake air pressure A in stage 2 of the first 4 engine cycles in FIG. 9 and the intake air pressure A' in stage 2 of the second 4 engine cycles are roughly the same, and the difference between the pressures A and A' is less than the deceleration determination threshold value DPMDEC, Thus, the steady status is determined.

Figure 10:
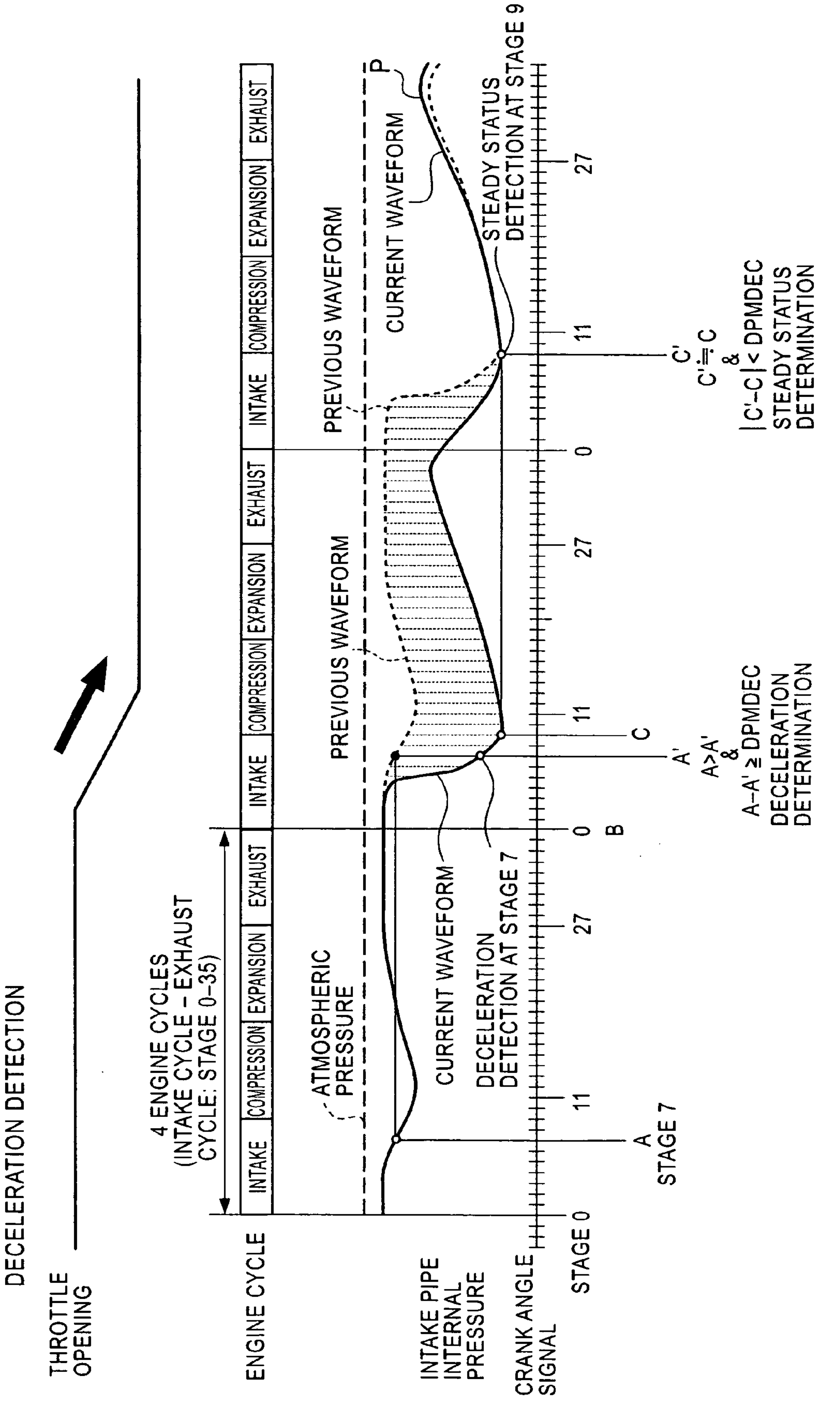
FIG. 10 is a diagram depicting the intake pipe internal pressure according to a modified embodiment of the FIG. 9 embodiment.

FIG. 10 shows a modification to the FIG. 9 embodiment. The difference between FIG. 9 and FIG. 10 is the timing of the deceleration operation. Specifically, the deceleration operation (downward black arrow) is performed from the intake cycle to the compression cycle of the second 4 engine cycles in FIG. 10. The low-speed status is maintained thereafter.

As FIG. 10 shows, the manifold pressure A in stage 7 of the first 4 engine cycles and the manifold pressure A' in stage 7 of the second 4 engine cycles are used for the deceleration determination. For the steady status determination, the manifold pressure C in stage 9 of the second 4 engine cycles and the manifold pressure C' in stage 9 of the third 4 engine cycles are used. When FIG. 10 is compared to FIG. 9, the timing of the deceleration operation is different, as mentioned earlier, so that the manifold pressure curve P during the second and third 4 engine cycles in FIG. 10 is quite different from that in FIG. 9.

In FIG. 10, the value A' is smaller than the value A, and the value A–value A' is not less than the deceleration determination threshold value DPMDEC. Consequently, the "engine in deceleration status" can be determined in stage 7 of the second 4 engine cycles. The deceleration status cannot be determined by comparing the intake manifold pressure in stage 6 of the second 4 engine cycles and the intake manifold pressure in stage 6 of the first 4 engine cycles (intake manifold pressure at 720 degrees before the crankshaft angle concerned). This is because the difference of the manifold pressures is smaller than the deceleration determination threshold value. In other words, the deceleration cannot be determined until stage 7 of the second 4 engine cycles.

In FIG. 10, the deceleration operation, which started in stage 4 of the second 4 engine cycles, can be detected in stage 7 of the second 4 engine cycles.

Then the value C' and the value C are compared in stage 9 of the third 4 engine cycles. As FIG. 10 shows, the value C' is roughly the same as the value C, and the absolute value of value C'–value C is less than the deceleration determination threshold value DPMDEC. Accordingly, it is determined that the engine is in low-speed steady status (state in which the decelerated condition is maintained) in stage 9 of the third 4 engine cycles. The low-speed steady status is determined after the deceleration determination is made.

Now the third embodiment of the present invention will be described with reference to FIG. 11, FIG. 12 and FIG. 13.

In the first and second embodiments, the determination of acceleration, deceleration and steady statuses of a single-cylinder 4-cycle engine is described, but the present invention can also be applied to a multiple-cylinder 4-cycle engine. In the third embodiment, the determination of acceleration, deceleration and steady statuses will be described using a 3-cylinder 4-cycle engine. Since the device shown in FIG. 1 and FIG. 2 can be used here, description of the device will be omitted.

First the determination of the steady status of the engine will be described with reference to FIG. 11.

Figure 11:
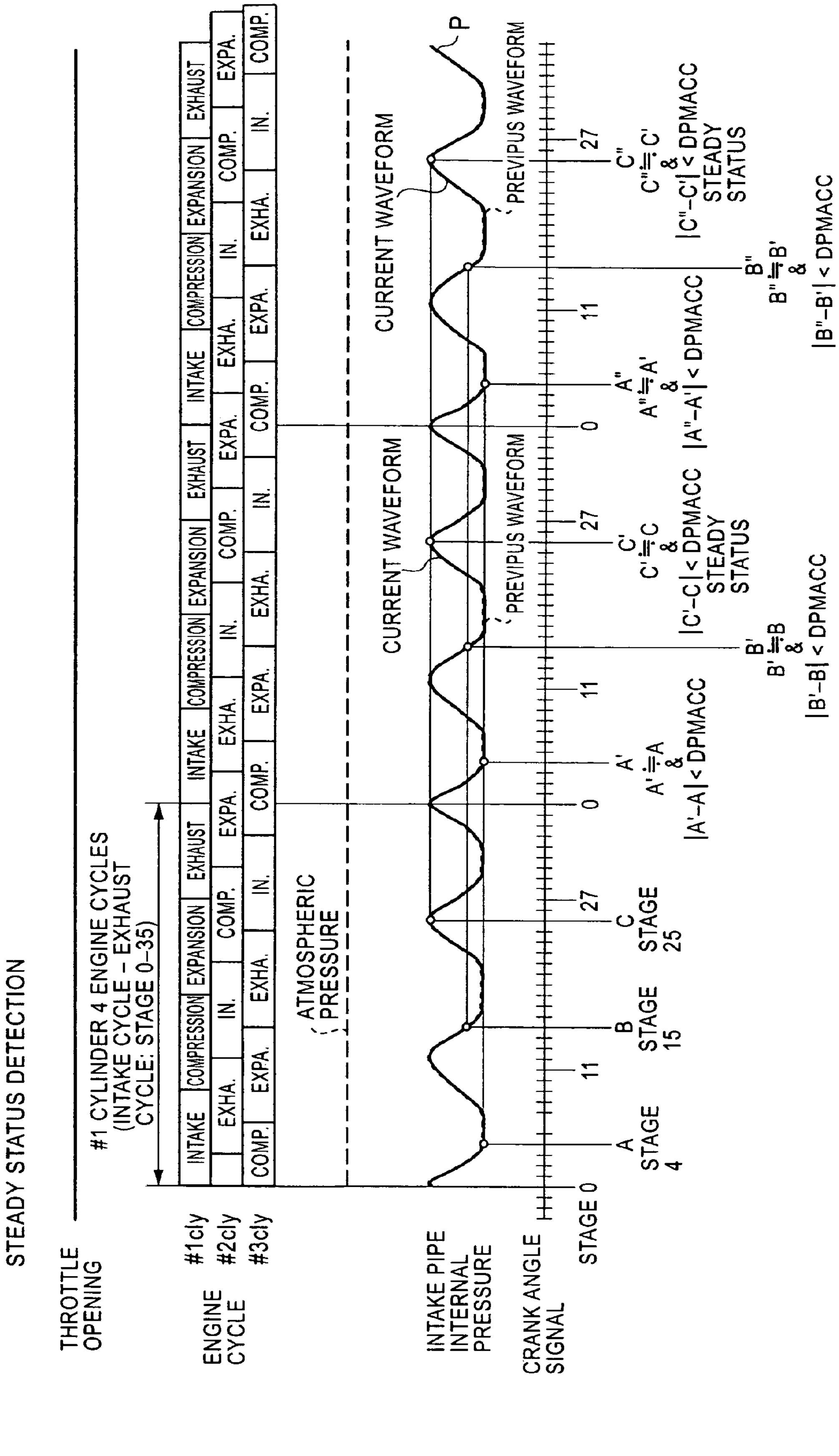
FIG. 11 is a diagram depicting the intake pipe internal pressure for judging steady operation according to a third embodiment of the present invention.

FIG. 11 is similar to FIG. 3. The difference lies in that three groups of 4 engine cycles are lined up in parallel in FIG. 11. The first group of 4 engine cycles is the engine cycles of the first cylinder (#1 cyl) of the engine, the second group of 4 engine cycles is the engine cycles of the second cylinder (#2 cyl), and the third group of 4 engine cycles is the engine cycles of the third cylinder (#3 cyl). In FIG. 11, the intake, compression, expansion and exhaust cycles of the first cylinder (#1 cly), second cylinder (#2 cly) and third cylinder (#3 cly) are shown above the intake manifold pressure curve P. Since the three cylinders are driven with the shift of a 240-degree crankshaft angle, the manifold pressure curve P has three peaks in each 4 engine cycles (stage 0 to stage 35).

In the following description, the engine cycles of the first cylinder are looked at, for the sake of description; when the "first 4 engine cycles", "second 4 engine cycles" and "third 4 engine cycles" are mentioned.

As FIG. 11 shows, the value A of the manifold pressure in stage 4 of the first 4 engine cycles is substantially equal to the value A' of the manifold pressure in stage 4 of the second 4 engine cycles, and the absolute value of the difference between the values A and A' is smaller than the acceleration determination threshold value DPMACC. Therefore the steady status can be determined in stage 4 of the second 4 engine cycles. Also the value A' is substantially equal to the manifold pressure A" at 720 degrees after the crankshaft angle of the value A', and the absolute value of the difference between the values A' and A" is smaller than the acceleration determination threshold value DPMACC. Thus, the steady status can be determined.

In the steady status, the value of the intake manifold pressure detected at an arbitrary crankshaft angle and the value of the intake manifold pressure detected at 720 degrees after this crankshaft angle are roughly the same in any stage. For example, in FIG. 11 the steady status can be determined by comparing the detected values B and B' (or the detected values B' and B") in stage 15 or by comparing the detected values C and C' (or the detected values C' and C") in stage 25.

Figure 12:
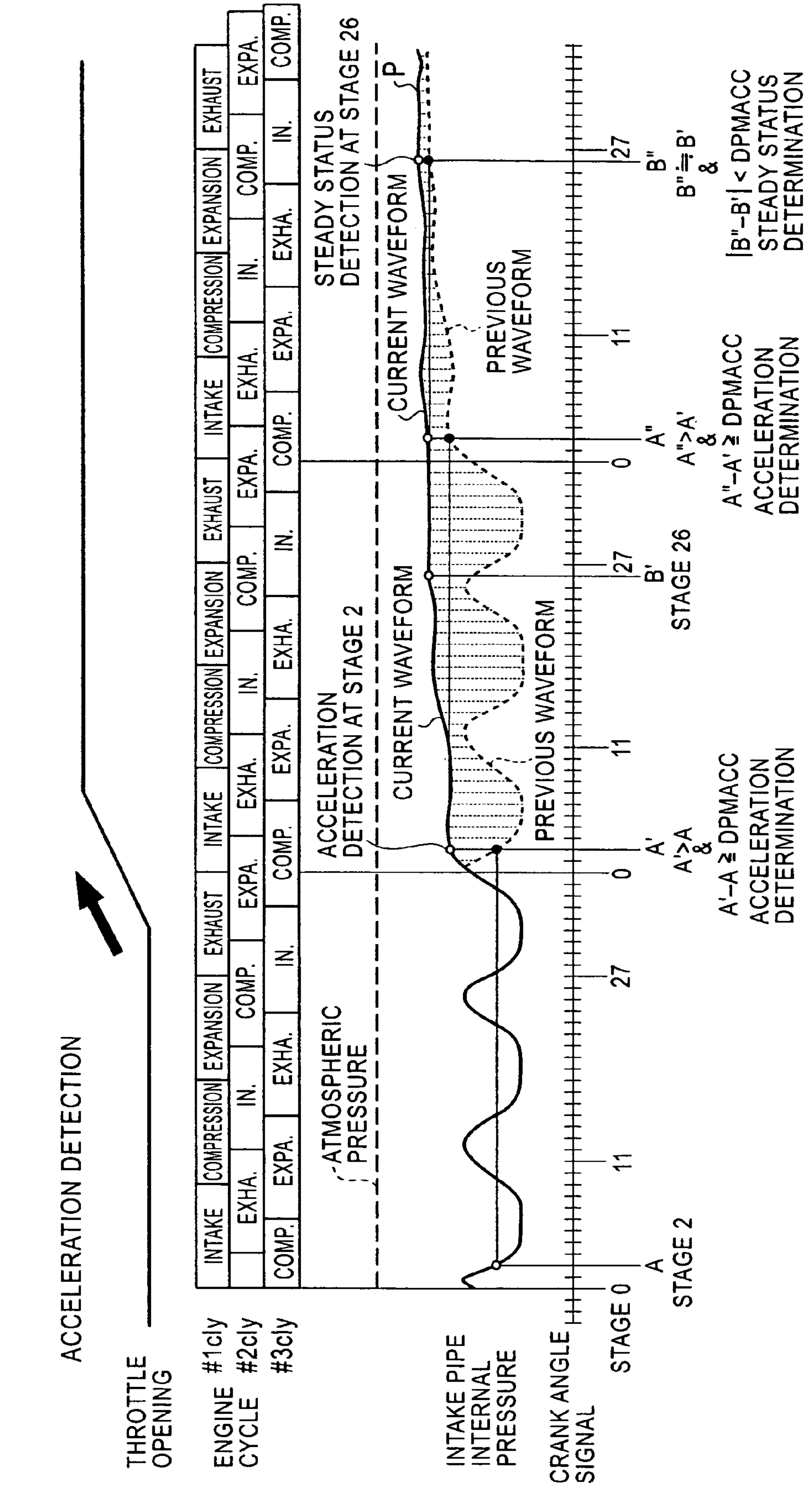
FIG. 12 is a diagram depicting the intake pipe internal pressure for judging acceleration according to the third embodiment of the present invention.

FIG. 12 shows the change of the intake pipe internal pressure P when the acceleration operation is performed (black arrow). In FIG. 12, the engine running in steady status is accelerated when the first cylinder is in the exhaust cycle of the first 4 engine cycles to the next intake cycle, and then the high-speed status is maintained. The intake pipe internal pressure P does not drop if the opening of the throttle valve is large (unlike the manifold pressure curve in FIG. 11, three peaks and three bottoms do not appear during stages 0-35), so that the manifold pressure curve P keeps a high value in the second 4 engine cycles and in the third 4 engine cycles. Specifically the manifold pressure curve P reaches a peak in stage 0 in the second 4 engine cycles, and then gradually increases.

As illustrated in FIG. 12, the value of the intake pipe internal pressure in stage 2 of the first 4 engine cycles is A, and the value of the intake pipe internal pressure in stage 2 of the next 4 engine cycles is A'. Since the value A' is greater than the value A and the value A'−value A is not less than the acceleration determination threshold value DPMACC, the acceleration can be detected in stage 2 of the second 4 engine cycles. The acceleration operation, which started in stage 33 of the first 4 engine cycles, can be detected in stage 2 of the second 4 engine cycles.

Whether this accelerated status (high-speed status) is maintained can be determined by comparing the intake pipe internal pressure B in stage 26 of the second 4 engine cycles and the intake pipe internal pressure B' at 720 degrees after the crankshaft angle of the pressure B. As FIG. 12 shows, the value B'' is roughly the same as the value B', and the absolute value of the difference between the pressures B and B' is smaller than the acceleration determination threshold value DPMACC. Thus, the steady status can be determined.

Figure 13:
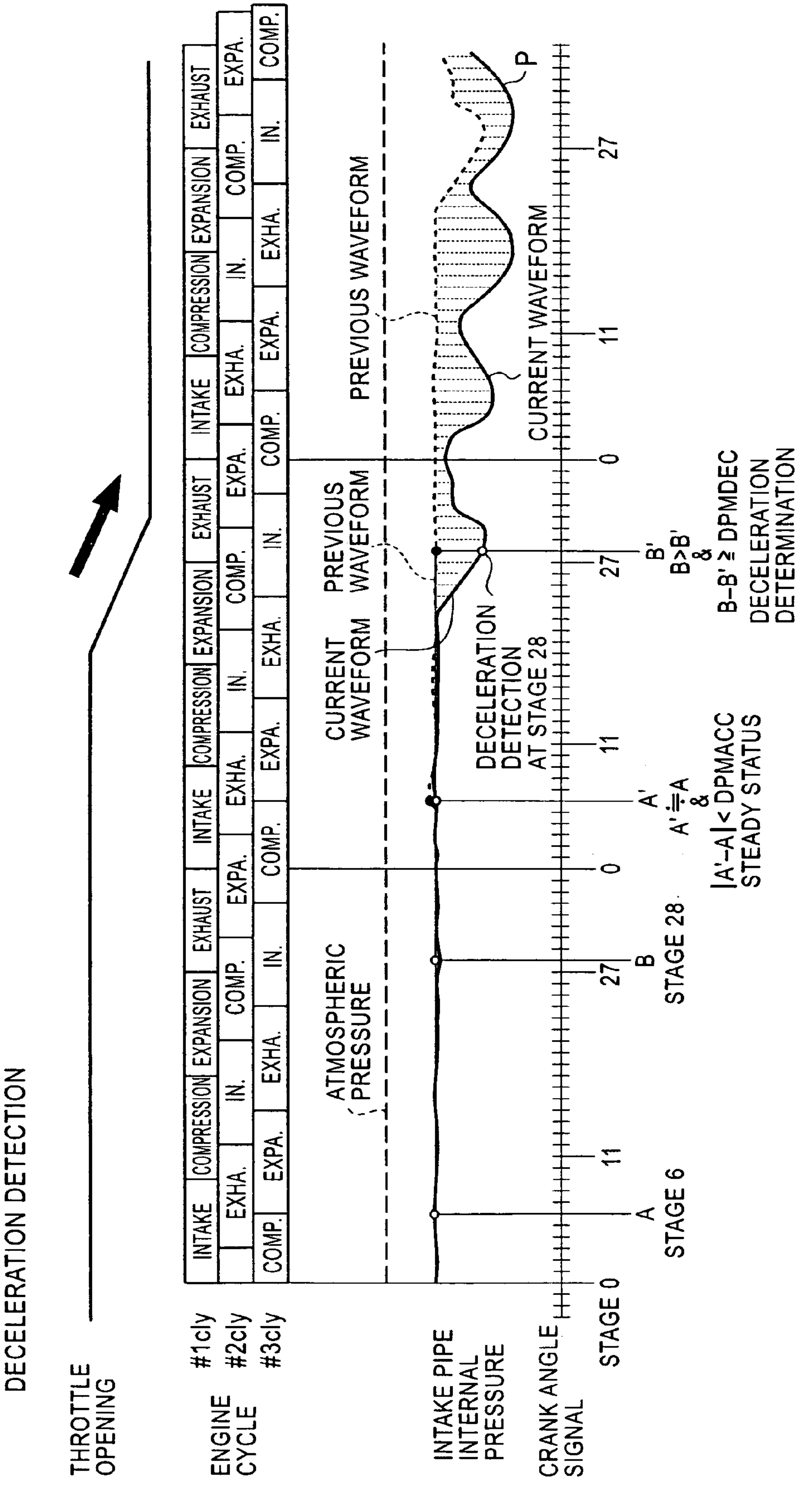
FIG. 13 is a diagram depicting the intake pipe internal pressure for judging deceleration according to the third embodiment of the present invention.

FIG. 13 is a continuation of FIG. 12, and shows the change of the intake pipe internal pressure P when the deceleration operation is performed from the high-speed steady status. In FIG. 13, the engine running at high-speed is decelerated when the first cylinder enters the expansion cycle and exhaust cycle of the second 4 engine cycles, and then the low-speed status is maintained. If the opening of the throttle value decreases, the negative pressure of the intake cycle of the three cylinders is detected by the intake manifold pressure sensor, so that three peaks appear in the intake manifold pressure curve in the 720-degree crankshaft angle range.

As FIG. 13 shows, the value of the intake pipe internal pressure in stage 6 of the first 4 engine cycles is A, and the value of the intake pipe internal pressure in stage 6 of the next 4 engine cycles is A'. The value A' is roughly the same as the value A, and the absolute value of the difference between the values A' and A is less than the acceleration determination threshold value DPMACC. Thus, it is determined in stage 6 of the second 4 engine cycles that the high-speed status is maintained. Whether deceleration is performed can be determined by comparing the intake pipe internal pressure B in stage 28 of the first 4 engine cycles and the intake pipe internal pressure B' at 720 degrees after this crankshaft angle, for example. As FIG. 13 shows, the value B' is smaller than the value B and the value B−value B' is not less than the deceleration determination threshold value DPMDEC. Thus, the deceleration can be determined. The deceleration operation, which started in stage 22 of the second 4 engine cycles, can be detected in stage 28 in the second 4 engine cycles.

It should be noted that the engine cycles may be determined using a cam angle sensor. Alternatively, the engine cycles may be determined using a reference tooth (e.g., either forming a missing tooth section or adding a reference tooth) created on the crankshaft.

This application is based on a Japanese Patent Application No. 2004-324859 filed on Nov. 9, 2004, and the entire disclosure thereof is incorporated herein by reference.

What is claimed is:

1. An acceleration detection device for a four-cycle engine, comprising:

a comparator for comparing a first manifold pressure at a first crankshaft angle with a second manifold pressure at 720 degrees before said first crankshaft angle; and a determination unit for determining that the engine is in acceleration status when a difference between the first and second manifold pressures is greater than an acceleration determination threshold value, and the first manifold pressure is higher than the second manifold pressure, wherein said determination unit performs an acceleration status determination when a difference between the second manifold pressure and a third manifold pressure at 1440 degrees before the first crankshaft angle is a predetermined value or less.

2. The acceleration detection device according to claim 1, wherein said first crankshaft angle is a predetermined angle in an intake cycle of the engine.

3. A deceleration detection device for a four-cycle engine, comprising:

a comparator for comparing a first manifold pressure at a first crankshaft angle with a second manifold pressure at 720 degrees before said first crankshaft angle; and a determination unit for determining that the engine is in deceleration status when a difference between the first and second manifold pressures is greater than a deceleration determination threshold value, and the first manifold pressure is lower than the second manifold pressure, wherein said determination unit performs a deceleration status determination when a difference between the second manifold pressure and a third manifold pressure at 1440 degrees before the first crankshaft angle is a predetermined value or less.

4. A device comprising:

a pressure sensor for measuring an intake manifold pressure of a four-cycle engine;

a storage unit for supplying a measurement value of said pressure sensor at a crankshaft angle 720-degree interval;

a stable status determination unit for determining that the engine is in a stable status when at least a certain number of said measurement values from said storage unit fall within in a predetermined range during a predetermined time;

a comparator for comparing a first manifold pressure measurement value at a first crankshaft angle with a second manifold pressure measurement value at 720 degrees before the first crankshaft angle when said stable status determination unit determines that said engine is in the stable status; and an acceleration/deceleration determination unit for determining that the engine is in acceleration status when a difference between the first and second manifold pressure measurement values is greater than an acceleration determination threshold value, and the first manifold pressure measurement value is higher than the second manifold pressure measurement value.

5. The device according to claim 4, wherein said acceleration/deceleration determination unit determines that the engine is in deceleration status when the difference between said first and second manifold pressure measurement values is greater than a deceleration determination threshold value, and the first manifold pressure measurement value is lower than the second manifold pressure measurement value.

6. The device according to claim 4, wherein said pressure sensor measures the intake manifold pressure at every 20-degree crankshaft angle interval.

7. An acceleration detection method for a four-cycle engine, comprising:

comparing a first manifold pressure at a first crankshaft angle with a second manifold pressure at 720 degrees before said first crankshaft angle; and determining that the engine is in acceleration status when a difference between the first and second manifold pressures is greater than a first predetermined value, and the first manifold pressure is higher than the second manifold pressure, wherein said engine acceleration status determination is performed when a difference between the second manifold pressure and a third manifold pressure at 1440 degrees before the first crankshaft angle is a second predetermined value or less.

8. A deceleration detection method for a four-cycle engine, comprising:

comparing a first manifold pressure at a first crankshaft angle and a second manifold pressure at 720 degrees before said first crankshaft angle; and determining that the engine is in deceleration status when the difference between the first and second manifold pressures is greater than a first predetermined value and the first manifold pressure is lower than the second manifold pressure, wherein said engine deceleration status determination is nerformed when a difference between the second manifold pressure and a third manifold pressure at 1440 degrees before the first crankshaft angle is a second predetermined value or less.

* * * * *